(12) United States Patent  (10) Patent No.: US 7,778,799 B2
Brandt et al.  (45) Date of Patent: Aug. 17, 2010

(54) AUTOMATED SELF TEST FOR A THERMAL PROCESSING SYSTEM

(75) Inventors: Aaron Donald Brandt, Grantham, NH (US); Richard Ray Anderson, Grantham, NH (US); Christopher Scott Passage, Canaan, NH (US); Wayne Chin, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 106 days.

(21) Appl. No.: 11/619,149

(22) Filed: Jan. 2, 2007

(65) Prior Publication Data

US 2008/0162080 A1    Jul. 3, 2008

(51) Int. Cl.
G06F 19/00 (2006.01)
G06F 17/40 (2006.01)
(52) U.S. Cl. .................. 702/182; 73/865.9; 702/34; 702/113; 702/183; 702/187
(58) Field of Classification Search .......... 148/194, 148/204, 205, 642, 694, 120, 121, 195, 508, 148/559, 639; 219/54, 55, 76.13, 76.17, 219/76.1, 78.01, 121.45, 617, 85.1, 50, 53, 219/59.1, 60 R, 68, 69.1, 69.11, 76.14, 76.16, 219/121.11, 121.12, 121.13, 121.18, 121.36, 219/121.39, 121.48, 121.49, 121.5, 121.51, 219/121.52, 121.53, 121.55, 121.56, 121.57, 219/121.6, 121.63, 121.67, 136, 137.2, 602, 219/603; 700/81, 207, 212, 1, 79, 80, 90, 700/95, 117; 702/183, 189, 1, 33, 34, 35, 702/57, 108, 113, 127, 182, 187, 188; 73/158.1, 73/432.1, 865.69; 324/72, 73.1
See application file for complete search history.

(56) References Cited

U.S. PATENT DOCUMENTS

| | | | | |
|---|---|---|---|---|
| 2,996,666 | A * | 8/1961 | Shields | 324/73.1 |
| 3,058,061 | A * | 10/1962 | Smith | 324/73.1 |
| 3,082,374 | A * | 3/1963 | Buuck | 324/73.1 |
| 3,237,100 | A * | 2/1966 | Chalfin et al. | 324/108 |
| 3,275,810 | A * | 9/1966 | Hartog et al. | 702/117 |
| 3,302,107 | A * | 1/1967 | Flaugher et al. | 324/170 |
| 4,301,351 | A * | 11/1981 | Mathews | 219/114 |
| 4,456,808 | A | 6/1984 | Wilkinson et al. | |

(Continued)

FOREIGN PATENT DOCUMENTS

EP    0 656 505    6/1975

(Continued)

OTHER PUBLICATIONS

International Search Report and Written Opinion for International Application No. PCT/US2007/088271 dated May 30, 2008.

*Primary Examiner*—Edward R Cosimano
(74) *Attorney, Agent, or Firm*—Proskauer Rose LLP

(57) ABSTRACT

Described are computer-based methods and apparatuses for automated self test for a thermal processing system. A signal to execute the automated self test is received. The automated self test is executed. The execution includes executing one or more self test instructions for the one or more subsystems of the system. Data can be received from sensors associated with the subsystems. The data can be analyzed to determine the results of the automated self test for the thermal processing system.

22 Claims, 8 Drawing Sheets

U.S. PATENT DOCUMENTS

| | | | |
|---|---|---|---|
| 4,456,809 A * | 6/1984 | Jones et al. | 219/108 |
| 4,872,926 A * | 10/1989 | Giacobbe | 148/511 |
| 5,073,919 A * | 12/1991 | Hagensick | 379/29.01 |
| 5,229,572 A * | 7/1993 | Ito | 219/121.67 |
| 5,390,019 A * | 2/1995 | Fritze et al. | 356/459 |
| 5,463,202 A | 10/1995 | Kurosawa et al. | |
| 5,671,351 A * | 9/1997 | Wild et al. | 714/38 |
| 6,028,287 A * | 2/2000 | Passage et al. | 219/121.56 |
| 6,040,550 A | 3/2000 | Chang | |
| 6,262,387 B1 | 7/2001 | Chang | |
| 6,297,472 B1 * | 10/2001 | Bong et al. | 219/125.12 |
| 6,298,454 B1 * | 10/2001 | Schleiss et al. | 714/37 |
| 6,479,792 B1 | 11/2002 | Beiermann et al. | |
| 6,504,131 B1 | 1/2003 | Hayes | |
| 6,538,568 B2 * | 3/2003 | Conley, III | 340/540 |
| 6,548,784 B2 | 4/2003 | Sammons et al. | |
| 6,557,118 B2 * | 4/2003 | Schleiss et al. | 714/37 |
| 6,570,130 B1 | 5/2003 | Kooken et al. | |
| 6,615,090 B1 * | 9/2003 | Blevins et al. | 700/26 |
| 6,633,782 B1 * | 10/2003 | Schleiss et al. | 700/26 |
| 6,770,846 B2 | 8/2004 | DeCoster | |
| 6,809,293 B2 | 10/2004 | Sammons et al. | |
| 6,849,826 B2 | 2/2005 | Hayes | |
| 6,961,871 B2 * | 11/2005 | Danialy et al. | 714/30 |
| 6,992,262 B2 | 1/2006 | Matus et al. | |
| 7,023,470 B2 * | 4/2006 | Braun | 348/180 |
| 7,165,011 B1 * | 1/2007 | Kaushal et al. | 702/182 |
| 2002/0010562 A1 * | 1/2002 | Schleiss et al. | 702/183 |
| 2002/0073374 A1 * | 6/2002 | Danialy et al. | 714/738 |
| 2002/0080027 A1 * | 6/2002 | Conley, III | 340/540 |
| 2002/0136165 A1 * | 9/2002 | Ady et al. | 370/241 |
| 2003/0137587 A1 * | 7/2003 | Braun | 348/181 |
| 2004/0034824 A1 * | 2/2004 | Wasielewski | 714/733 |
| 2004/0199351 A1 | 10/2004 | Ott et al. | |
| 2005/0127053 A1 | 6/2005 | Hayes | |
| 2005/0265734 A1 | 12/2005 | Byun | |
| 2006/0163220 A1 * | 7/2006 | Brandt et al. | 219/121.55 |
| 2007/0255991 A1 * | 11/2007 | Kaushal et al. | 714/733 |
| 2008/0059106 A1 * | 3/2008 | Wight et al. | 702/119 |
| 2008/0126001 A1 * | 5/2008 | Murray et al. | 702/119 |

FOREIGN PATENT DOCUMENTS

| | | |
|---|---|---|
| EP | 1 091 199 | 4/2001 |
| EP | 1 112 800 | 7/2001 |
| JP | 2001-159913 | 12/2001 |

* cited by examiner

Table 1. Example of Successful Automated Self Test

| Test | Activation | Output | Result |
|---|---|---|---|
| Power Supply Input | Verify that the electrical power line has power (e.g., 120-230 Volts, 1-Phase, 50/60 Hertz) | 120 Volts, 1-Phase, 60 Hertz | OK |
| Power Supply Choppers | Verify choppers are able to provide output (e.g., 18 Amps at 120 Volts) | 18 Amps at 120 Volts | OK |
| Plasma Torch Shield Select | Energize the shield select valve for two seconds | Shield select valve energizes for two seconds | OK |
| Plasma Torch Select Valve | Energize the select valve for two seconds | Select valve energizes for two seconds | OK |
| Plasma Torch Shield Valve | Energize the shield off valve for two seconds | Shield off valve energizes for two seconds | OK |
| Gas Supply Preflow Valve | Energize the preflow off valve for two seconds | Preflow off valve energizes for two seconds | OK |
| Gas Supply Plasma Valve | Energize the plasma off valve for two seconds | Plasma off valve energizes for two seconds | OK |
| Gas Supply Vent Valve | Energize the vent valve for two seconds | Vent valve energizes for two seconds | OK |
| System Leak Check | Pressurize the system, close the inlet and outlet valves, and monitor the pressure of the system (e.g., 80 psi) | System remains pressurized at 80 psi | OK |
| Inlet Leak Check | Drain all gas pressure from the system, close the inlet and outlet valves, and monitor the pressure of the system (e.g., 0 psi) | System remains at 0 psi | OK |

FIG. 6

Table 2. Example of Automated Self Test with Issue

| Test | Activation | Output | Result |
|---|---|---|---|
| Power Supply Input | Verify that the electrical power line has power (e.g., 120-230 Volts, 1-Phase, 50/60 Hertz) | 120 Volts, 1-Phase, 60 Hertz | OK |
| Power Supply Choppers | Verify choppers are able to provide output (e.g., 18 Amps at 120 Volts) | 18 Amps at 120 Volts | OK |
| Plasma Torch Shield Select | Energize the shield select valve for two seconds | Shield select valve energizes for two seconds | OK |
| Plasma Torch Select Valve | Energize the select valve for two seconds | Select valve energizes for two seconds | OK |
| Plasma Torch Shield Valve | Energize the shield off valve for two seconds | Shield off valve energizes for two seconds | OK |
| Gas Supply Preflow Valve | Energize the preflow off valve for two seconds | Preflow off valve energizes for two seconds | OK |
| Gas Supply Plasma Valve | Energize the plasma off valve for two seconds | Plasma off valve energizes for two seconds | OK |
| Gas Supply Vent Valve | Energize the vent valve for two seconds | Vent valve energizes for two seconds | OK |
| System Leak Check | Pressurize the system, close the inlet and outlet valves, and monitor the pressure of the system (e.g., 80 psi) | System pressure drops to 78 psi | Report drop in system pressure |
| Inlet Leak Check | Drain all gas pressure from the system, close the inlet and outlet valves, and monitor the pressure of the system (e.g., 0 psi) | System remains at 0 psi | OK |

FIG. 7

Table 3. Example of Automated Self Test with Failures

| Test | Activation | Output | Result |
|---|---|---|---|
| Power Supply Input | Verify that the electrical power line has power (e.g., 120-230 Volts, 1-Phase, 50/60 Hertz) | 120 Volts, 1-Phase, 60 Hertz | OK |
| Power Supply Choppers | Verify choppers are able to provide output (e.g., 18 Amps at 120 Volts) | 0 Amps at 0 Volts | No Output Power from Choppers |
| Plasma Torch Shield Select | Energize the shield select valve for two seconds | Shield select valve energizes for two seconds | OK |
| Plasma Torch Select Valve | Energize the select valve for two seconds | Select valve energizes for two seconds | OK |
| Plasma Torch Shield Valve | Energize the shield off valve for two seconds | Shield off valve energizes for two seconds | OK |
| Gas Supply Preflow Valve | Energize the preflow off valve for two seconds | Preflow off valve energizes for two seconds | OK |
| Gas Supply Plasma Valve | Energize the plasma off valve for two seconds | Plasma off valve energizes for two seconds | OK |
| Gas Supply Vent Valve | Energize the vent valve for two seconds | Vent valve energizes for two seconds | OK |
| System Leak Check | Pressurize the system, close the inlet and outlet valves, and monitor the pressure of the system (e.g., 80 psi) | System pressure drops to 10 psi | System Leak – Check inlet and outlet valve |
| Inlet Leak Check | Drain all gas pressure from the system, close the inlet and outlet valves, and monitor the pressure of the system (e.g., 0 psi) | System remains at 0 psi | OK |

FIG. 8

AUTOMATED SELF TEST FOR A THERMAL PROCESSING SYSTEM

FIELD OF THE INVENTION

The present invention relates generally to computer-based methods and apparatuses for automated self test for a thermal processing system.

BACKGROUND

The testing of a thermal processing system is important to ensure that the thermal processing system is operating efficiently and safely. The ability for a thermal processing system to operate efficiently allows the system to use less electrical power, gas, and consumables which decreases the operating cost of the system. The safe use of the thermal processing system allows for the protection of the user of the system and a longer useful life span for the system. The overall use of testing to increase the efficiency and safety of a thermal processing system increases the return on investment for the system.

Known testing methods include a test mode in which the inputs to a power supply are set to a known state and the outputs and sensor readings are read by a technician. The gas supply system, the cooling system, and the computer numerical controller (CNC) interface input and output signals can be tested using this method. Known testing methods also include a manual test sequence in which the power supply enters a test mode and a technician performs external actions (e.g., manually turning on/off gas supply). The technician selects the test sequence, performs external actions, and monitors sensors and gauges during the test.

The need to set the inputs to the system to a known state and monitor the output makes it challenging, if not impossible, to remove the human interaction element of testing. The human interaction is prone to errors, leads to the misinterpretation of sensor readings, and increases the total cost of ownership of the system. Since errors, misinterpretation, and costs affect the efficiency and safety of thermal processing systems, it is important for industries that use thermal processing system to have a system that allows for automated self testing to decrease the human interaction needed to detect problems with the system.

SUMMARY OF THE INVENTION

Thermal processing systems, such as laser and plasma systems, are widely used in the cutting, welding, heat treating, and processing of materials. One aspect to an automated self test for a thermal processing system is a method. The method includes receiving, at a switch module, a signal to execute the automated self test. The test module executes the automated self test. The automated self test includes one or more self test instructions for one or more subsystems of the thermal processing system. The report module receives data from the one or more subsystems.

Another aspect to an automated self test for a thermal processing system is a system. The system includes a switch module for receiving a signal to execute the automated self test. The system includes a test module for executing the automated self test. The automated self test includes one or more self test instructions for the one or more subsystems of the thermal processing system. The system includes a report module for receiving data from one or more subsystems.

Another aspect to an automated self test for a thermal processing system is a system. The system includes a means for receiving a signal to execute the automated self test. The system includes a means for executing the automated self test. The automated self test includes one or more self test instructions for one or more subsystems of the thermal processing system. The system includes a means for receiving data from the one or more subsystems.

In other examples, any of the aspects above can include one or more of the following features. The execution of the automated self test can include the test module controllably activating one or more components associated with the one or more subsystems. The self test instructions test the one or more components associated with the one or more subsystems.

In yet other examples, the one or more components include a gas supply line, an electrical power line, a part associated with a power supply, a part associated with a gas supply, a part associated with a coolant supply, a part associated with a plasma torch, a part associated with a laser torch, a valve, and/or a consumable.

In other examples, the receiving of the data by the report module includes receiving data from one or more sensors associated with the one or more components. The report module processes the data to determine results of the automated self test. The report module generates a report and displays the report at a displaying device.

In yet other examples, the report module generates a report and transmits the report over a network to a remote displaying device. The transmission over the network is on a serial communications network, a controller area network, an internal network, an external network, a local area network, a wide area network, a private network, and/or a public network. The report module generates a report and stores the report on a memory module.

In other examples, the self test instructions test the one or more subsystems. The one or more subsystems includes a power supply subsystem, a gas supply subsystem, a coolant supply subsystem, a plasma torch, and/or a laser torch. The thermal processing system is a plasma torch system or a laser torch system.

In yet other examples, the receiving data includes receiving the signal from a serial communication network, a controller area network, an internal network, an external network, a local area network, a wide area network, a private network, and/or a public network.

In other examples, the one or more self test instructions are stored on a memory module. The memory module is volatile memory and/or non-volatile memory.

Any of the aspects and examples above can provide one or more of the following advantages. An advantage of the automated self test is that human intervention is not needed to put the inputs of a thermal processing system into a known state which decreases the errors associated with the testing of the system. Another advantage of the automated self test is that human intervention is not needed to monitor the outputs of a thermal processing system which decreases the errors associated with the testing of the system.

Another advantage of the automated self test is that the self test instructions are stored on memory modules which can be updated to allow the testing of different parts of the thermal processing system. Another advantage of the automated self test is that the user can preemptively run the automated self test to detect potential failures which decreases downtime for the thermal processing system by preemptively fixing problems with the system. Yet another advantage of the automated self test is that it enables a user to test the thermal processing system with a limited number of steps (e.g., pushing a test button on the system and checking the results of the test).

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 6 is illustrates a table of activations, outputs, and results of an exemplary automated self test.

FIG. 7 is illustrates a table of activations, outputs, and results of an exemplary automated self test.

FIG. 8 is illustrates a table of activations, outputs, and results of an exemplary automated self test.

DETAILED DESCRIPTION

Figure 1:
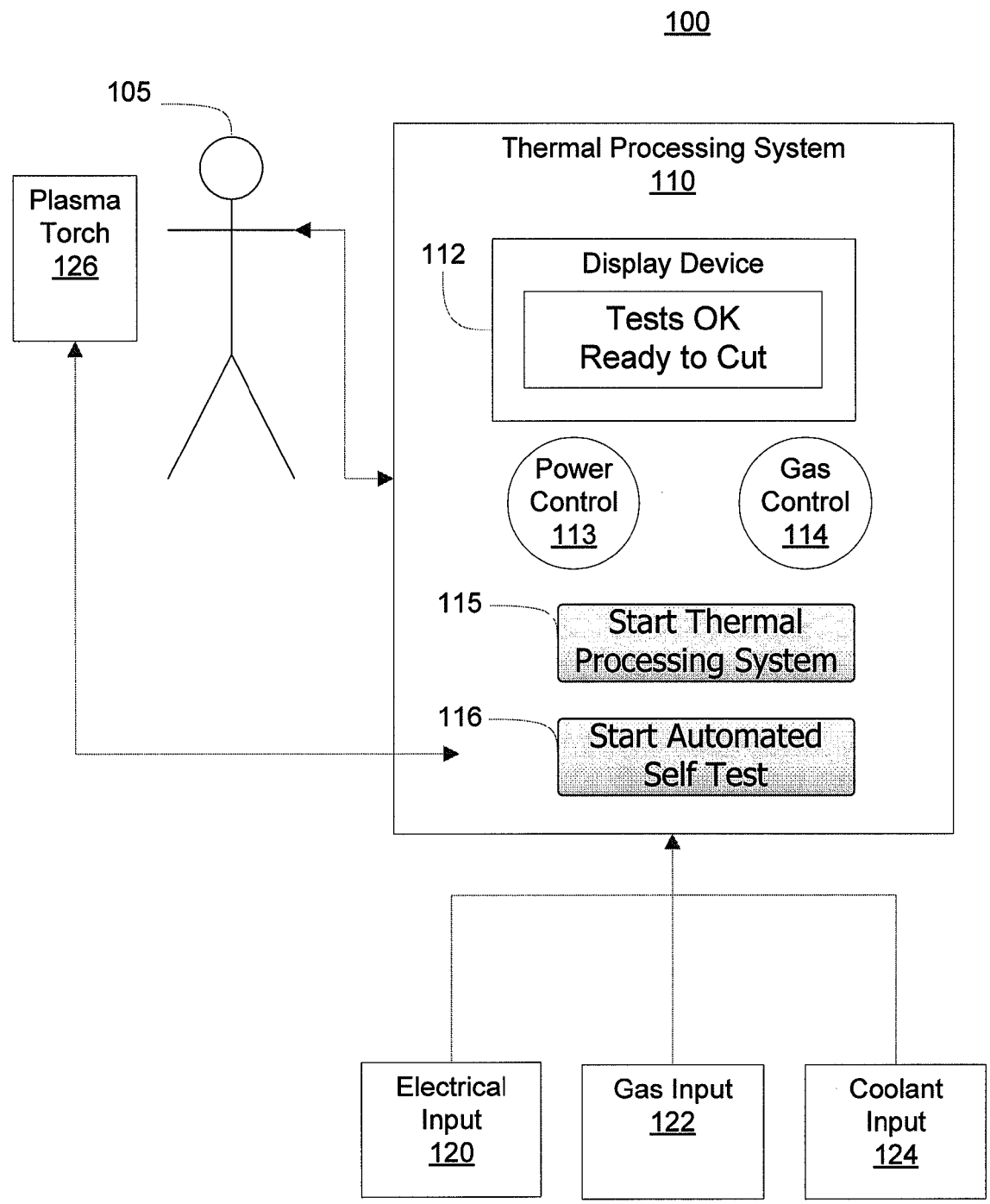
FIG. 1 is a diagram of an exemplary thermal processing system.

FIG. 1 is a diagram 100 of an exemplary thermal processing system 110. The user 105 controls the thermal processing system 110 through a power control 113, a gas control 114, a start thermal processing system control 115, and a start automated self test control 116. The user 105 receives feedback (e.g., control messages, error messages) from a display device 112. The user 105 utilizes a plasma torch 126 to process (e.g., cut, weld, heat treating) work material (e.g., mild steel, stainless steel, aluminum). The thermal processing system 110 receives inputs from an electrical input 120, a gas input 122, and a coolant input 124.

The user 105 can, for example, process work material by activating the start thermal processing system control 115 and using the plasma torch 126 to process the work material. The user 105 can control the power of the plasma torch 126 by adjusting the power control 113. The power of the plasma torch 126 can be controlled to allow for different widths, depths, marking, scoring, and/or dimpling of the work material. The power control 113 can, for example, be a rheostat, electronically programmable power control module, or digitally programmable power control module. The user 105 can control the gas (e.g., oil free air, nitrogen) of the plasma torch by adjusting the gas control 114. The gas control 114 can, for example, be an electronically programmable gas control module associated with a gas valve or a knob physically associated with a gas valve.

In some examples, the user 105 sends a signal to execute an automated self test by activating the start automated self test control 116. The start automated self test control 116 sends a signal to a switch module to execute the automated self test. The switch module communicates to a test module to execute the automated self test. The automated self test includes one or more self test instructions for one or more subsystems of the thermal processing system 110. The self test instructions include instructions to control the electrical input 120, the gas input 122, the coolant input 124, and/or the plasma torch 126.

A report module receives data from the one or more subsystems. The report module processes the data to determine results (e.g., system ready, electrical input below minimum voltage, gas input below minimum pressure) of the automated self test. A report is generated and displayed at the display device 112. The automated self test allows a user 105 to test the thermal processing system 110 with a limited number of steps (e.g., pushing a test button and checking the results).

Figure 2:
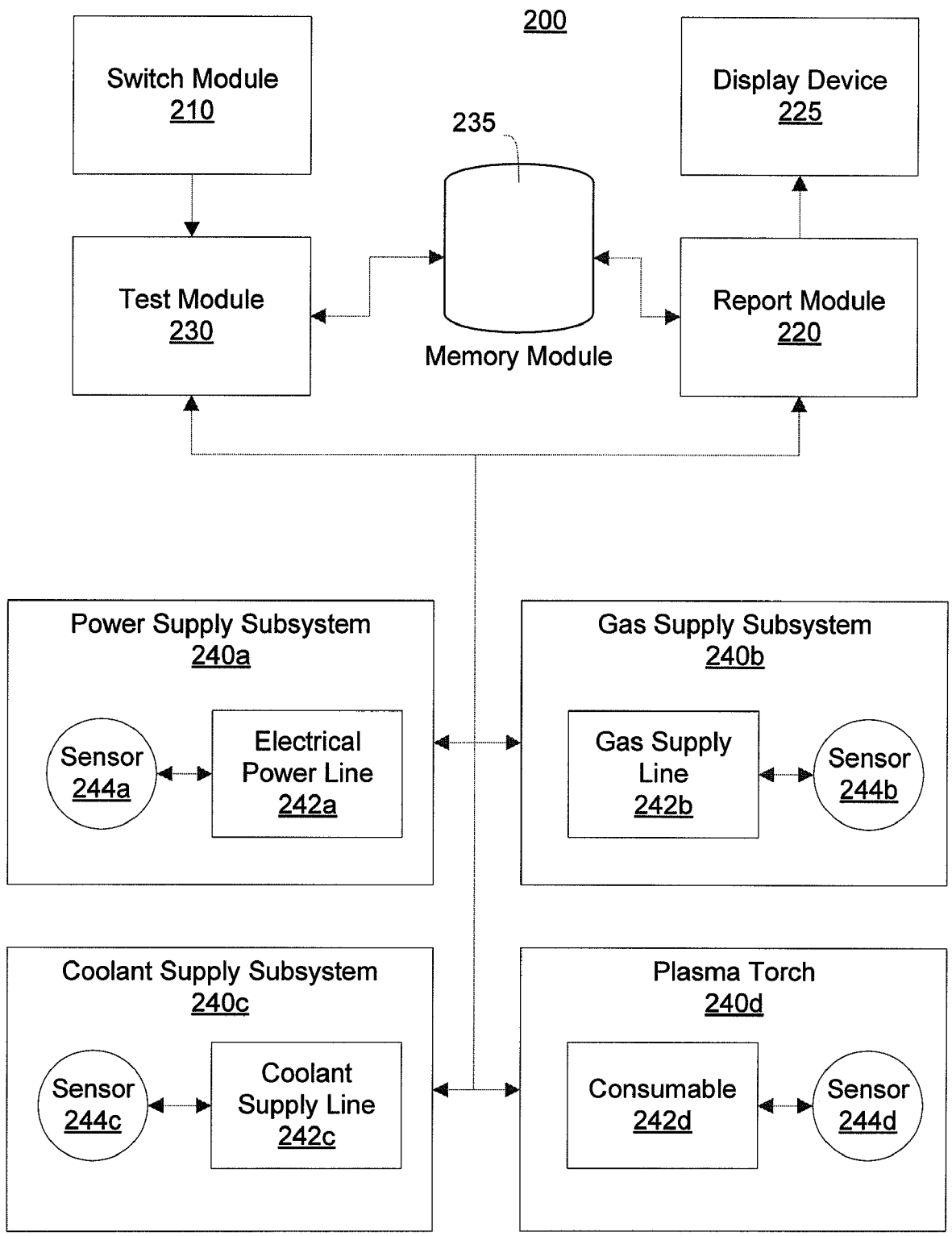
FIG. 2 is a functional block diagram of an exemplary thermal processing system with a display device.

FIG. 2 is a functional block diagram of an exemplary thermal processing system 200 with a display device 225. The thermal processing system 200 can, for example, be a plasma torch system or a laser torch system. The switch module 210 receives a signal to execute an automated self test. The signal can, for example, be received from a control module on the thermal processing system 200, from a serial communication network, a controller area network, an internal network, an external network, a local area network, a wide area network, a private network, or a public network. The switch module 210 communicates the initiation of the automated self test to a test module.

The test module 230 executes the automated self test. The automated self test includes one or more self test instructions for the one or more subsystems of the thermal processing system 200. The one or more self test instructions test the one or more subsystems and/or one or more components associated with the one or more subsystems. The one or more subsystems include a power supply subsystem 240a, a gas supply subsystem 240b, a coolant supply subsystem 240c, a plasma torch 240d, and/or a laser torch. For example, the self test instructions are executable to energize the power supply, toggle a series of solenoid values, and perform leak checks. The self test instructions can, for example, be executed on a processor and/or special circuitry.

The self test instructions can, for example, be stored on a memory module 235. The memory module 235 can be volatile memory and/or non-volatile memory. The memory module 235 can, for example, be write once erasable program read only memory (EPROM), erasable flash electronically erasable programmable read only memory (EEPROM), an integrated drive electronics (IDE) compatible hard disk, an IDE drive including flash memory chips, floppy disk drive readable and writable by a personal computer, erasable flash memory in a standard format (e.g., CompactFlash, Smart Media, MultiMediaCard, Secure Digital, xD Picture Card). An advantage of storing the automated self test on a memory module is that the automated self test can be quickly and easily updated by updating the memory module with new self test instructions. The updating of the memory module can, for example, include exchanging the Secure Digital flash memory card with a newer version.

In some examples, the test module 230 controllably activates one or more components associated with the one or more subsystems (e.g., power supply subsystem 240a). The components include an electrical power line 242a, a gas supply line 242b, a coolant supply line 242c, a consumable 242d (e.g., nozzle, swirl ring, electrode, o-ring, deflector), a part associated with a power supply (e.g., chopper), a part associated with a gas supply (e.g., gas input valve), a part associated with a coolant supply (e.g., coolant input valve), a part associated with a plasma torch (e.g., plasma input valve), a part associated with a laser torch (e.g., torch power supply component), and/or a valve (e.g., gas output valve).

The controllably activating the one or more components includes, for example, turning on and/or off the power supply subsystem 240a components. For example, the test module 230 can activate the power supply subsystem 240a by enabling and disabling the electrical power line 242a.

A report module 220 receives data from one or more subsystems. The report module 220 can, for example, receive data from one or more sensors associated with the one or more components (e.g., power supply subsystem 240a). The one or more sensors include sensors 244a, 244b, 244c, and 244d in the power supply subsystem 240a, the gas supply subsystem 240b, the coolant supply subsystem 240c, and the plasma torch 240d, respectively. The report module 220 can process the data to determine results of the automated self test and generate a report.

The report module 220 displays the report at a display device 225. The display device 225 can, for example, be a liquid crystal display (LCD) on the thermal processing system 200. The report module 220 stores the report on the memory module 235. The stored report on the memory module 235 can, for example, be used by the user or a technician to review past reports from the automated self test. Although the exemplary thermal processing system 200 shows one memory module 235 for storing the self test instructions and for storing the reports, the system 200 can have a plurality of memory modules (e.g., 235) for storing self test instructions and/or reports.

For example, the report module 220 can be connected to a plurality of flash memory cards. After the one or more reports (e.g. reports for the month of December) are stored on a first flash memory card, then the first flash memory card is removed from the system 200 and replaced with a second flash memory card. The one or more reports on the first flash memory card can be reviewed at a local display device (e.g., personal computer, personal digital assistant (PDA)) and/or a remote display device (e.g., personal computer connected to a network). The first flash memory card can, for example, be sent to a central maintenance facility for a review of the one or more reports. An advantage of the exemplary system 200 is the ability to store the automated self test reports for future diagnostics which enables the detection of common problems with thermal processing systems (e.g., 200).

Figure 3:
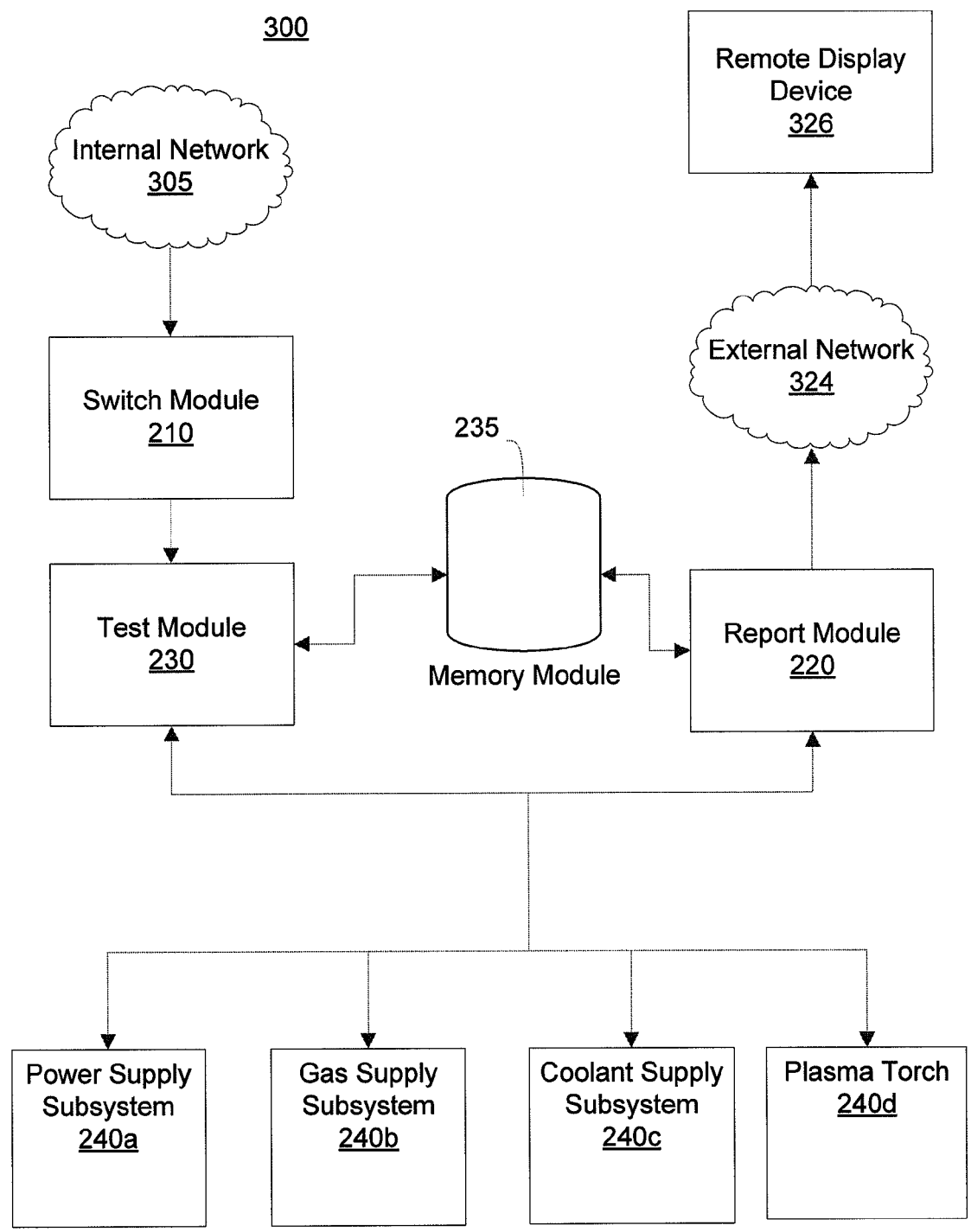
FIG. 3 is a functional block diagram of an exemplary thermal processing system with a remote display device.

FIG. 3 is a functional block diagram of an exemplary thermal processing system 300 with a remote display device 326. The switch module 210 receives a signal from an internal network 305 to execute the automated self test. The internal network 305 can, for example, be a serial communications network, a controller area network, a local area network, a wide area network, a private network, and/or a public network. An advantage of the exemplary system 300 is that the signal to execute the automated self tests can originate from outside of the exemplary system 300 and be transmitted through the internal network 305 to the switch module 210 which enables the remote execution of the automated self test.

The test module 230 retrieves the automated self test from the memory module 235 and executes the automated self test. The automated self test includes self test instructions for the power supply subsystem 240a, the gas supply subsystem 240b, the coolant supply subsystem 240c, and the plasma torch 240d. The report module 220 receives data from the subsystems (e.g., power supply subsystem 240a). The report module 220 processes the data to determine results of the automated self test.

The report module 220 generates a report from the results of the automated self test. The report module 220 transmits the report over an external network 324 to a remote displaying device 326. The report can, for example, be transmitted over the external network 324 on a serial communications network, a controller area network, an internal network, an external network, a local area network, a wide area network, a private network, and/or a public network. The report is stored on a memory module 235.

Figure 4:
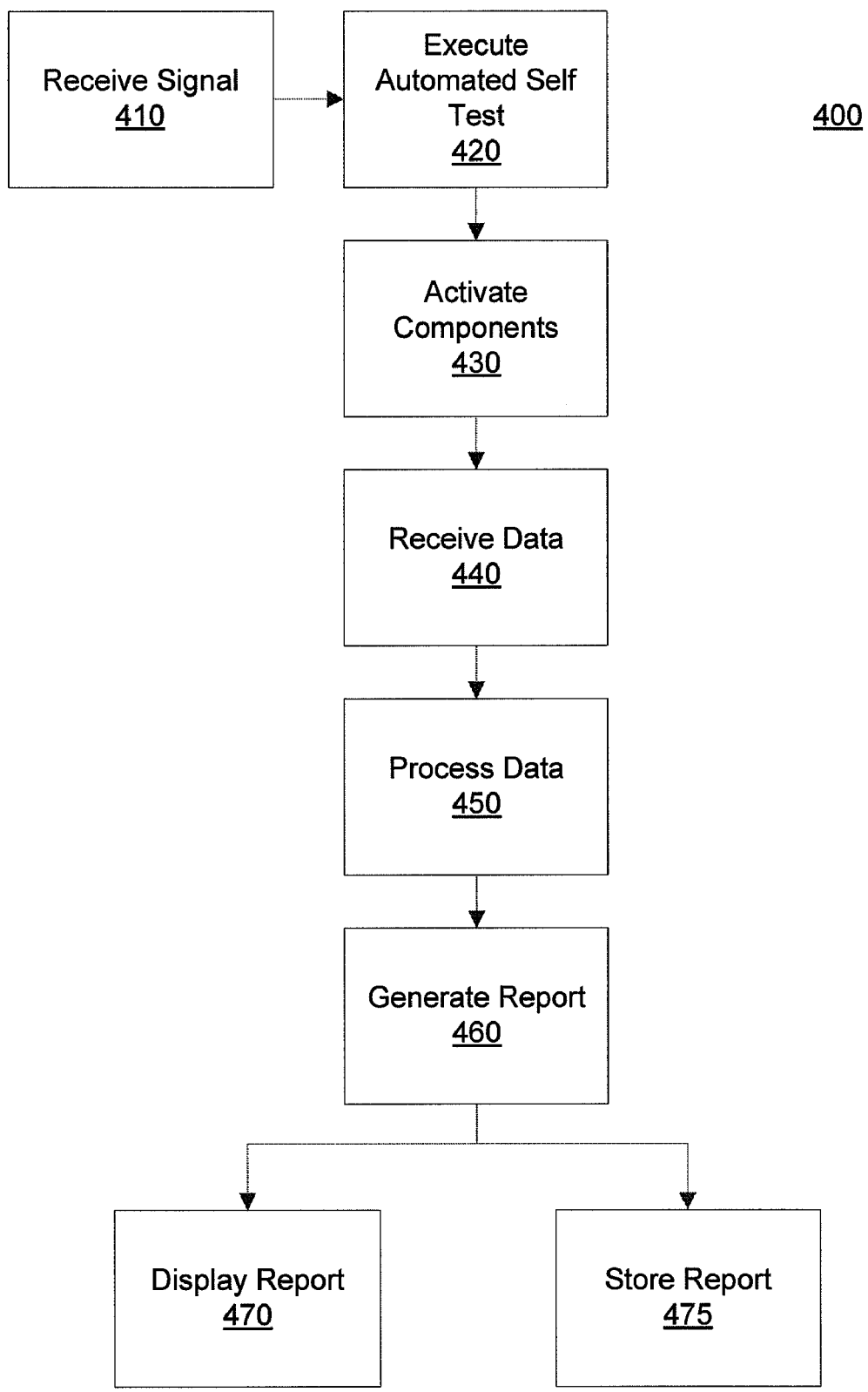
FIG. 4 is a flowchart depicting an exemplary thermal processing system with a display device.

FIG. 4 is a flowchart 400 depicting an automated self test through the exemplary thermal processing system 200 with a display device 225 of FIG. 2. The switch module 210 receives (410) a signal to execute the automated self test. The test module 230 executes (420) the automated self test. The execution (420) of the automated self test includes activating (430) components (e.g., electrical power line 242a) of the subsystems (e.g., power supply subsystem 240a). The report module 220 receives (440) data from one or more sensors (e.g., 244a) associated with the components (e.g., 242a) of the subsystems (e.g., 240a).

The report module 220 processes (450) the data received from the sensors (e.g., 244a) and generates (460) a report. The report includes information pertaining to the success (e.g., system ok) or failure (e.g., chopper not providing output power—0 amps at 0 volts) of the system 200. The report is displayed (470) on the display device 225 and stored (475) on the memory module 235.

For example, the report module 220 receives (440) data, voltage of 1.58V, from the power supply subsystem sensor 244a. The report module 220 processes (450) the data from the power supply subsystem sensor 244a. The report generated (460) from the data includes information indicating that the incoming line voltage on the electrical power line 242a is 5% lower than nominal. In another example, the report module 220 receives (440) data, voltage of 3.3V, from the gas supply line sensor 244b. The report module 220 processes (450) the data from the gas supply line sensor 244b. The report generated (460) from the data includes information indicating a pressure reading of 145 psi at the plasma gas supply line 242b. In yet another example, the report module 220 receives (440) data, voltage of 1.1V, from the coolant supply sensor 244c. The report module 220 processes (450) the data from the coolant supply sensor 244c. The report generated (460) from the data includes information indicating a torch coolant flow rate of 1.0 gallons per minute.

The report can, for example, include error codes which are generated (450) from the data that is received from the sensors (e.g., 244a). For example, the tests were successfully (e.g., all of the tests were ok) and the error code, 012 which is associated with "Test Passed," is displayed (470) on the display device 225 and stored (475) on the memory module 235. Other variations of the error code include 013 which is associated with "Error in the Plasma Gas Channel," 014 which is associated with "Error in the Preflow Gas Channel,", and 015 which is associated with "Error in the Shield Gas Channel." Other variations of the error codes and their associations will be readily apparent to those skilled in the art.

Figure 5:
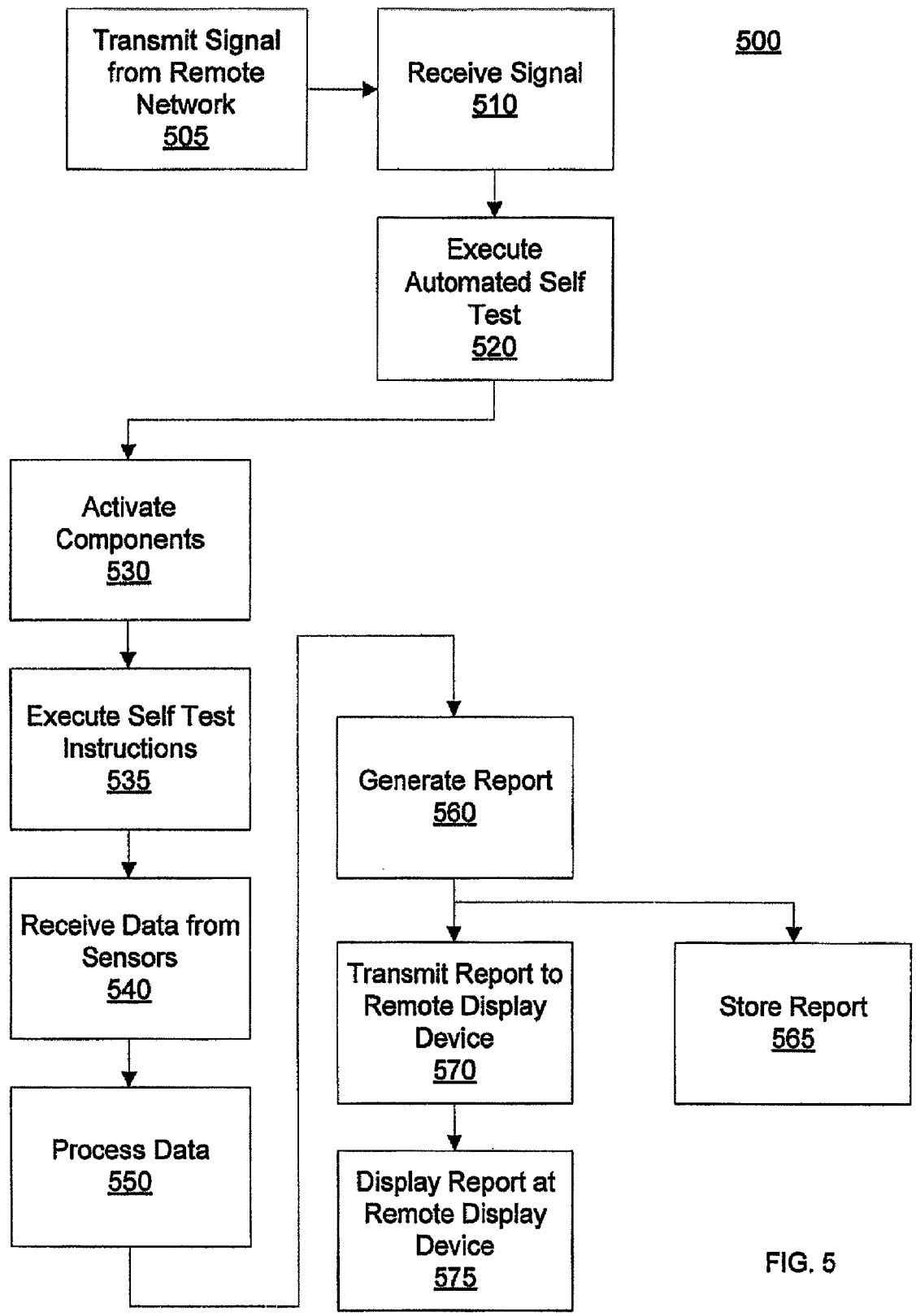
FIG. 5 is a flowchart depicting an exemplary thermal processing system with a remote display device.

FIG. 5 is a flowchart 500 depicting an automated self test through the exemplary thermal processing system 200 with a remote display device 326 of FIG. 3. The process of the automated self test is similar in parts to FIG. 4 above. A signal is transmitted (505) from a remote network (e.g., internal network 305). The signal is received (510) by the switch module 210. The test module 230 executes (520) the automated self test. The execution (520) of the automated self test includes activating (530) the subsystems (e.g., power supply subsystem 240a) and executing self test instructions (535). The report module 220 receives (540) data from one or more sensors associated with the subsystems (e.g., 240a).

The report module 220 processes (550) received from the sensors and generates (560) a report. The report includes information pertaining to the success (e.g., system ok) or failure (e.g., chopper not providing output power—0 amps at 0 volts) of the system 300. The report is transmitted (570) to a remote display device 326 through a network (e.g., external network 324) and stored (565) on the memory module 235. The report is displayed (575) on the remote display device 326.

Examples of the activations, outputs, and results are shown in the tables of FIGS. 6-8.

Table 1 of FIG. 6 illustrates an exemplary successful test sequence for the system 200 of FIG. 2. The test sequence tests components of the power supply subsystem 240a, the gas supply subsystem 240b, the coolant supply subsystem 240c, and the plasma torch 240d. Sensors (e.g., 244a) in each of the subsystems (e.g., 240a) receive data associated with the tests of the subsystems (e.g., 240a) and send the data to a report module 220. For example, the activation of the components by the test module 230 includes verifying that the electrical power line 242a has power. The verification includes checking the output of the electrical power line 242a to ensure that the power is within line specification (e.g., 120-230 volts, 1-phase, 50/60 hertz). A sensor 244a associated with the electrical power line 242a determines the power of the line and if the power of the line is within the specification, then the electrical power line 242a is ok. As illustrated in Table 1, all of the exemplary tests in the automated self test were successful and the report generated by the report module 220 is "Tests OK—Ready to Cut" as illustrated by the display device 112 in FIG. 1.

Table 2 of FIG. 7 illustrates an exemplary test sequence for the system 200 with an issue. The issue can, for example, be a problem that allows the system 200 to operate, but warns the user of maintenance that needs to be done on the system 200. For example, the activation of the components by the test module 230 includes a system leak check. The system leak check pressurizes the system 200, closes the inlet and outlet valves, and monitors the pressure of the system 200. The system 200 can, for example, be monitored by a sensor (e.g., 244b) in the gas supply subsystem 240b. The system 200 is pressurized to 80 pounds per square inch (psi) and the inlet and outlet valves are closed. The sensor (e.g., 244b) monitors the pressure of the system 200 for five minutes. If the pressure changes from the set pressurization (e.g., 80 psi), then the report module 220 generates an error report. If the pressure does not change from the set pressurization (e.g., 80 psi), then the report module 220 generates that the system leak check was ok.

As illustrated by Table 2, the system leak check test monitored a 2 psi drop in pressure during the test. Since the pressurization of the system 200 changed during the leak (i.e., dropped by 2 psi), then the report module 220 generates a report that the system leak test failed and reports the drop in system pressure. The report of the drop in system pressure can, for example, be stored on the memory module 235. The reports stored on the memory module 235 and accessed for analysis by the user, a technician, a manufacturer of the system 200, and/or other individuals associated with the operation of the system 200.

Table 3 of FIG. 8 illustrates an exemplary test sequence for the system 200 which indicates multiple failures. For example, the test includes activating the power supply choppers to verify that the choppers are able to convert the input electrical power supply (120 volts at 60 hertz) into an output power supply (e.g., 18 amps at 120 volts). The data from the test can, for example, be collected by a sensor (e.g., 244a) associated with the chopper. The sensor (e.g., 244a) transmits the data to the report module 220. The data is processed by the report module 220 to generate a report. If the output power supply choppers are not within predefined limits (e.g., 10 amps at 120 volts through 18 amps at 120 volts), then the report module 220 will generate a report from the data that indicates that the choppers have failed and will give the output of the choppers. For example, the test includes a system leak check as described above. If the pressurization of the system 200 has dropped from 80 psi to 10 psi, then a sensor (e.g., 244c) associated with the system 200 detects the change in pressurization and transmits the data to the report module 220. The report module 220 generates a report that indicates that the system leak test was executed on the system 200 and the system 200 failed the test and went from 80 psi to 10 psi.

Although tables 1-3 of FIGS. 6-8, respectively, give example test sequences, other variations will be readily apparent to those skilled in the art. Other variations include, for example, testing the valves for more (e.g., ten seconds) or less (e.g., one second) depending on the configuration and needs (e.g., faster testing, complete testing of the subsystems) of the system 200. The tests included in the test sequence can, for example, also be modified according to the configuration and needs of the system 200. For example, the system can test the gas supply pressure to ensure that the gas supply line 242b is providing the proper input to the system 200. In some examples, the sequence of the tests can be modified according to the configuration and needs of the system 200. For example, the input pressure of the gas supply line 242b can be tested before the gas supply preflow valve to ensure that the gas supply preflow valve is operating under working conditions (e.g., proper pressurization of the gas supply for the system 200).

The above-described systems and methods can be implemented in digital electronic circuitry, in computer hardware, firmware, and/or software. The implementation can, for example, be in a machine-readable storage device, for execution by, or to control the operation of, data processing apparatus. The implementation can, for example, be a programmable processor, a computer, and/or multiple computers.

Method steps can be performed by one or more programmable processors executing a computer program to perform functions of the invention by operating on input data and generating output. Method steps can also be performed by and an apparatus can be implemented as special purpose logic circuitry. Modules, subroutines, and software agents can refer to portions of the computer program, the processor, the special circuitry, software, and/or hardware that implements that functionality. Special circuitry can, for example, be a FPGA (field programmable gate array) and/or an ASIC (application-specific integrated circuit).

Memory modules suitable for embodying instructions and data include all forms of non-volatile memory, including by way of example semiconductor memory devices. The memory modules can, for example, be EPROM, EEPROM, flash memory devices, magnetic disks, internal hard disks, removable disks, magneto-optical disks, flash drives, CD-ROM, and/or DVD-ROM disks. The processor and the memory can be supplemented by, and/or incorporated in special purpose logic circuitry.

The components of the system can be interconnected by any form or medium of digital data communication (e.g., a communication network). Examples of communication networks include a local area network (LAN), a wide area network (WAN), the Internet, wired networks, and/or wireless networks.

Comprise, include, and/or plural forms of each are open ended and include the listed parts and can include additional parts that are not listed. The terminology and/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of an automated self test of multiple torch subsystems of a plasma torch cutting system for cutting a metallic workpiece, the torch subsystems including a power supply, a gas supply subsystem, and a plasma torch, the method comprising:
receiving, at a switch module, a signal to execute an automated self test of at least one of the torch subsystems;
executing, at a test module, the automated self test wherein the automated self test comprises self test instructions for the at least one subsystem;
controllably activating, at the test module, one or more components associated with the at least one torch subsystem;
receiving, at a report module, data from the at least one torch subsystem; and
cutting the metallic work piece.

2. The method of claim 1 wherein the self test instructions test the one or more components associated with the at least one torch subsystem.

3. The method of claim 1 wherein the one or more components comprise a gas supply line, an electrical power line, a part associated with a power supply, a part associated with a gas supply, a part associated with a coolant supply, a part associated with a plasma torch, a valve, a consumable, or combinations thereof.

4. The method of claim 1 wherein the receiving data further comprises:
receiving data from one or more sensors associated with the one or more components.

5. The method of claim 1 wherein the self test instructions test the at least one torch subsystems.

6. The method of claim 1 wherein the torch subsystems further comprise a coolant supply subsystem.

7. The method of claim 1 wherein the receiving data comprises receiving the signal from a serial communication network, a controller area network, an internal network, an external network, a local area network, a wide area network, a private network, a public network, or combinations thereof.

8. The method of claim 1 wherein executing the self test further comprises energizing at least one of the power supply, toggling a series of valves, performing leak checks, or a combination thereof.

9. The method of claim 1 wherein the one or more self test instructions are stored on a memory module.

10. The method of claim 9 wherein the memory module is volatile memory, non-volatile memory, or combinations thereof.

11. The method of claim 1 further comprising:
processing the data at the report module to determine results of the automated self test.

12. The method of claim 11, further comprising:
generating a report at the report module; and
displaying the report at a displaying device.

13. The method of claim 11, further comprising:
generating a report at the report module; and
storing the report on a memory module.

14. The method of claim 11 wherein processing the data to determine results further comprises processing the data to determine at least one of a system ready status, electrical input voltage, or gas input pressure.

15. The method of claim 11, further comprising:
generating a report at the report module; and
transmitting the report over a network to a remote displaying device.

16. The method of claim 15 wherein the transmitting over the network is on a serial communications network, a controller area network, an internal network, an external network, a local area network, a wide area network, a private network, a public network, or combinations thereof.

17. A plasma torch system for cutting a metallic workpiece having multiple torch subsystems including a power supply, a gas supply subsystem, and a plasma torch, the torch system comprising:
a switch module for receiving a signal to execute an automated self test of one or more subsystems of the torch system;
a test module for executing the automated self test wherein the automated self test comprises one or more self test instructions for the one or more subsystems of the torch system such that the test module controllably activates one or more components associated with the one or more torch subsystems; and
a report module for receiving data from the one or more subsystems.

18. The system of claim 17 further comprising:
a memory module for storing the self test instructions.

19. The system of claim 17 wherein:
the report module is receiving data from one or more sensors associated with the one or more components, processing the data to determine results of the automated self test, and generating a report.

20. The system of claim 19 wherein:
the report module is displaying the report at a displaying device.

21. The system of claim 19 wherein:
the report module is transmitting the report over a network to a remote displaying device.

22. The system of claim 19 wherein:
the report module is storing the report on a memory module.

* * * * *